United States Patent [19]

Ryan

[11] Patent Number: 5,078,579
[45] Date of Patent: Jan. 7, 1992

[54] SIDE ENTRY FISH PUMP

[76] Inventor: Robert M. Ryan, 5651-40th Ave. W., Seattle, Wash. 98199

[21] Appl. No.: 544,245

[22] Filed: Jun. 26, 1990

[51] Int. Cl.[5] .............................................. F04F 1/02
[52] U.S. Cl. ................................... 417/126; 417/138; 417/148; 417/149; 406/109
[58] Field of Search ............... 417/137, 138, 140, 145, 417/146, 148, 149, 126; 43/6.5; 406/109, 163, 151, 168

[56] References Cited

U.S. PATENT DOCUMENTS

| | | |
|---|---|---|
| 1,089,851 | 3/1914 | McNeill . |
| 3,262,396 | 7/1966 | Kingsbury ........................... 417/138 |
| 3,423,130 | 1/1969 | Milner . |
| 3,552,054 | 1/1971 | Hansen . |
| 3,930,755 | 1/1976 | Lahr et al. ........................... 417/138 |
| 4,168,864 | 9/1979 | Weeks ................................. 406/109 |
| 4,293,250 | 10/1981 | Hayashi . |
| 4,517,099 | 5/1985 | Breckner . |
| 4,700,547 | 10/1987 | Hayashi . |
| 4,826,362 | 5/1989 | Hayashi . |
| 4,885,012 | 12/1989 | Thompson .......................... 406/109 |

FOREIGN PATENT DOCUMENTS

| 1006762 | 3/1977 | Canada .................................. 417/138 |
|---|---|---|
| 1174520 | 9/1984 | Canada . |

Primary Examiner—Richard A. Bertsch
Assistant Examiner—Michael I. Kocharov
Attorney, Agent, or Firm—Seed and Berry

[57] ABSTRACT

A wet pump for pumping fish from a first fish receptacle to a second receptacle displaced from the first receptacle. The wet pump includes a wet pump tank into which the fish are initially pumped, a pump suction line connected to the side of the tank and communicating the tank with the first receptacle, a pump discharge line for pumping the fish from the tank, a pump system for initially creating a low pressure vacuum in the tank and for thereafter creating a high pressure in the tank, an inlet valve for opening the pump suction line when the pump creates the vacuum in the tank and for closing the pump suction line when the pump creates the high pressure in the tank, a discharge valve for closing the pump discharge line when the pump creates the vacuum and for opening the pump discharge line when the pump creates the high pressure, and a hood surrounding the inlet valve for preventing water from flowing proximate the inlet valve such that the fish do not interfere with the closing of the inlet valve when the pump is switched from the vacuum mode to the high pressure mode. When the pump creates the vacuum, the fish are suctioned through the pump suction line into the tank, and when the pump creates the high pressure, the fish are pumped from the tank through the discharge line into the second receptacle.

11 Claims, 2 Drawing Sheets

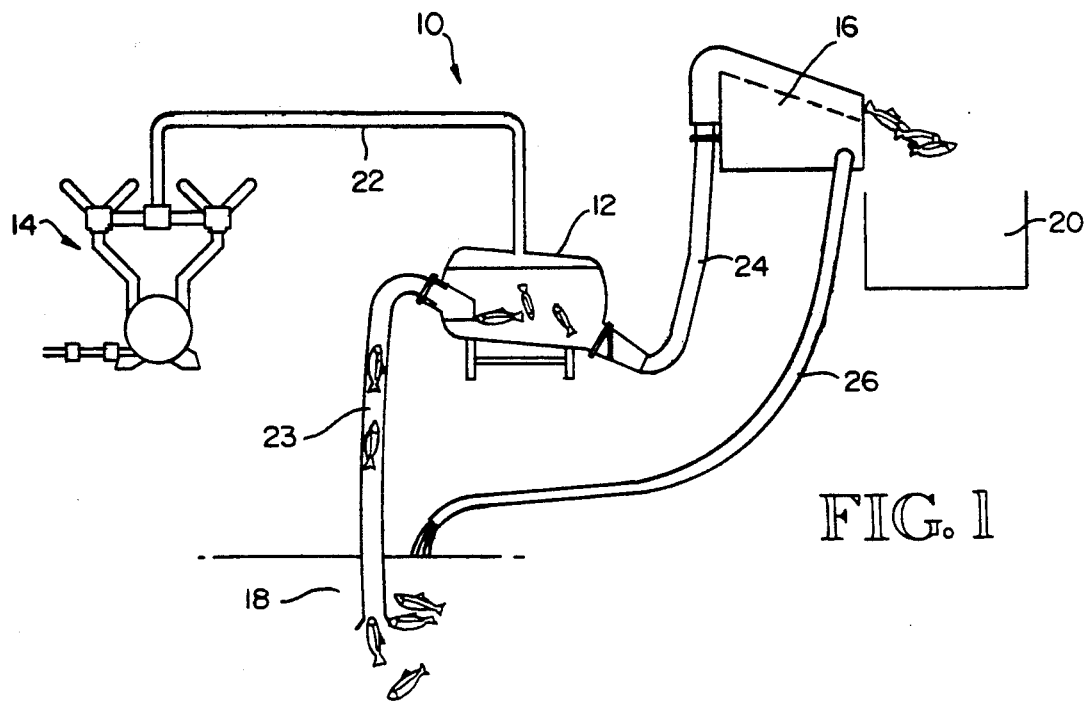
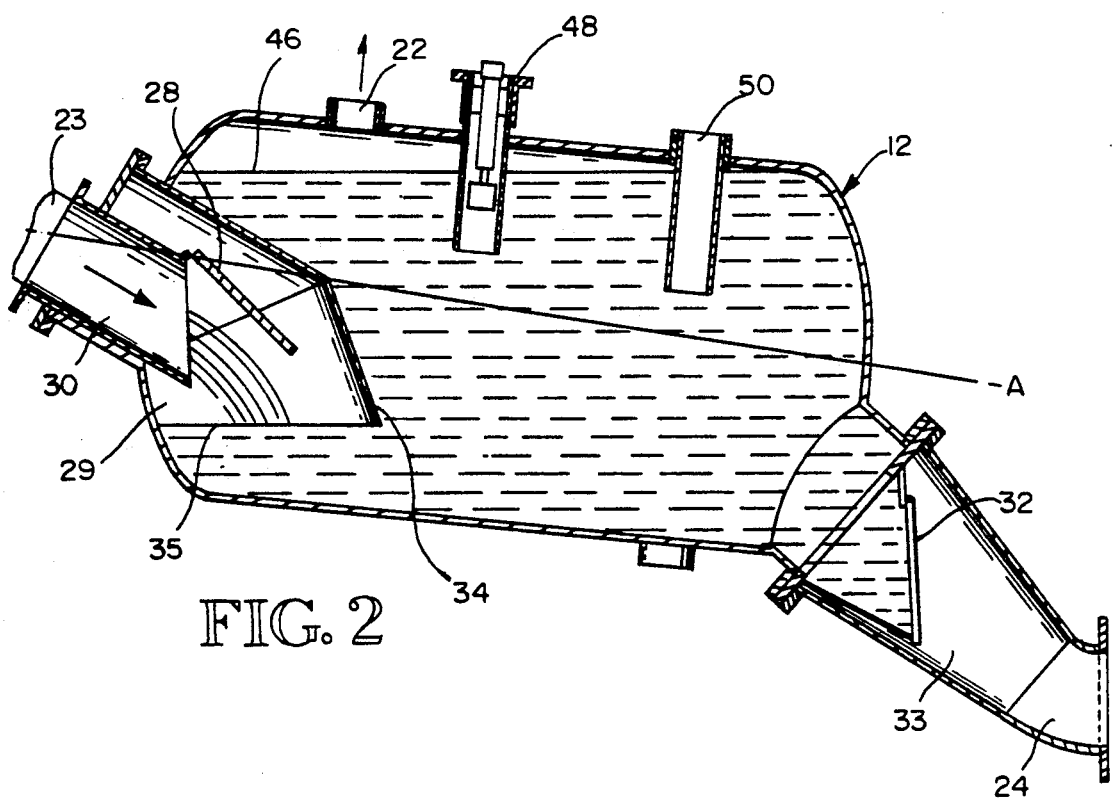

SIDE ENTRY FISH PUMP

TECHNICAL FIELD

The invention relates to an apparatus and method for pumping solids, such as fish, carried in a liquid, such as water.

BACKGROUND OF THE PRIOR ART

Wet fish pumps are utilized for pumping fish from storage receptacles, such as the hold of a ship, to spatially separated receptacles for storage or processing. In pumping fish, or other solids, it is important that the fish not be passed through the pump. Accordingly, it is known to suction the fish into a wet pump tank through an inlet and thereafter discharge the fish from the tank through a discharge by applying high pressure to the wet pump tank. The inlet to the tank and the discharge from the tank each have a valve such that when low pressure is applied to the tank the discharge valve is closed and the inlet valve is open permitting the fish to be suctioned into the tank. Once the fish are in the tank, the inlet valve is then closed, the tank pressurized and the discharge valve opened to permit the fish to be pumped from the tank.

A problem often encountered with this type of pump is that the fish get trapped in the inlet valve when the valve is closed subsequent to the fish being suctioned into the wet pump tank. When this happens, the inlet valve becomes locked in the open position, making it impossible to pressurize the tank as necessary to discharge the fish from the discharge port.

U.S. Pat. No. 4,517,099 discloses a fish pump which was designed to correct this problem. To achieve this, the '099 patent discloses locating the inlet valve to the tank above the maximum upper level of liquid that will accumulate within the tank so that the fish will not interfere with the closure of the inlet valve. However, this type of design is disadvantageous in that the fish which are initially suctioned into the tank fall a great distance to the bottom of the tank, sometimes as great as six feet, resulting in bruising of the fish.

SUMMARY OF THE INVENTION

The invention is designed to overcome the problems noted above regarding jamming of the inlet valve of the wet pump tank and minimizing the bruising of the fish when introduced into the tank.

The present invention resides in a wet pump tank for pumping fish from a first fish receptacle to a second receptacle, comprising a wet pump tank into which the fish are initially pumped, a pump suction line connected to the side of the tank and communicating the tank with the first receptacle, a pump discharge line for pumping the fish from the tank to the second receptacle, a pump system for initially creating a low pressure vacuum in the tank and for thereafter creating a high pressure in the tank, an inlet valve for opening the pump suction line when the pump creates the vacuum in the tank and for closing the pump suction line when the pump creates the high pressure in the tank, a discharge valve for closing the pump discharge line when the pump creates the vacuum and for opening the pump discharge line when the pump creates the high pressure, and a hood surrounding the inlet valve for preventing water from flowing proximate the inlet valve such that the fish do not interfere with the closing of the inlet valve when the pump is switched from the vacuum mode to the high pressure mode.

The pump suction line is connected to the side of the tank at a position below the maximum water line such that the distance in which the fish fall into the tank is minimized to prevent fish from becoming bruised. Preferably, the suction line is connected midway between the top and bottom of the tank. When the pump creates the vacuum, the fish are suctioned from the first receptacle through the pump suction line into the tank, and when the pump creates the high pressure, the fish are pumped from the tank through the discharge line and into the second receptacle.

BRIEF DESCRIPTION OF THE DRAWINGS

FIG. 1 is a cross-sectional, elevational view of the fish pumping system according to the invention.

FIG. 2 is a cross-sectional view of the wet pump tank of the system at the stage where the fish are being suctioned into the tank according to a first embodiment of the invention.

DETAILED DESCRIPTION OF THE INVENTION

Figure 3:
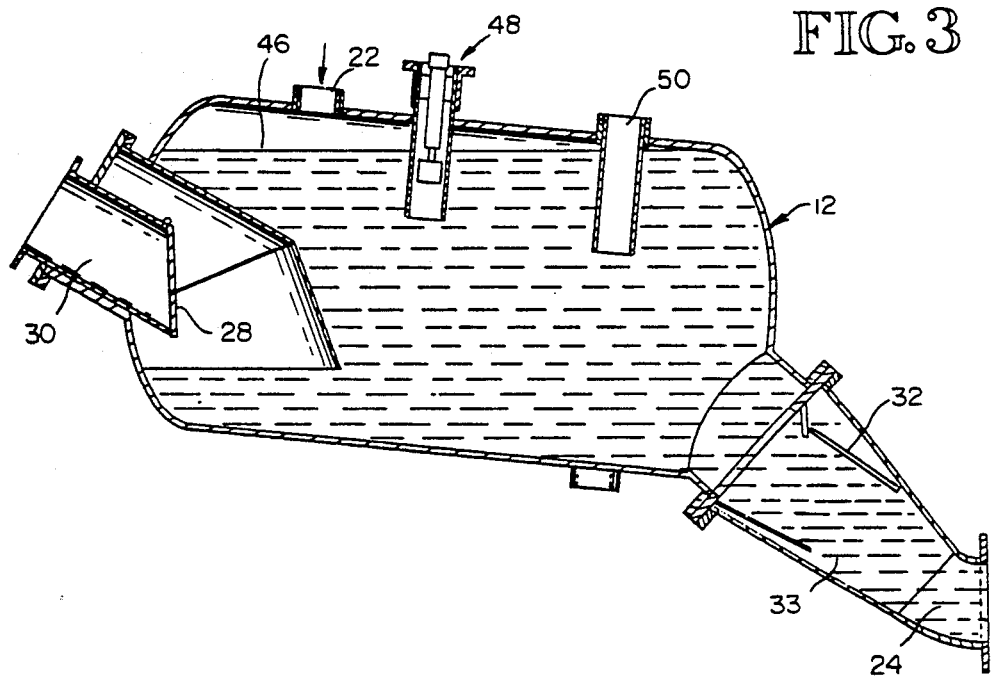
FIG. 3 is a cross-sectional view of the wet pump tank of the system at the stage where the fish are being discharged from the tank according to the first embodiment of the invention.

Referring to FIG. 1, the fish pumping system 10 includes a wet pump tank 12, pumping system 14, and separator 16 for pumping fish from a fish inlet receptacle 18 to a fish discharge receptacle 20. An airflow line 22 communicates the pumping system 14 with the wet pump tank 12, a pump suction line 23 communicates fish inlet receptacle 18 with the wet pump tank 12, a pump discharge line 24 communicates the wet pump tank with the separator, and a water return line 26 communicates the separator with the fish inlet receptacle. As will be described in detail below, low pressure is initially applied to the tank so as to suction the fish from the fish inlet receptacle into the tank, and, thereafter, high pressure is applied to the tank to discharge the fish from the tank into the discharge receptacle.

Referring to FIG. 2, the wet pump tank 12 includes an inlet valve 28 for opening and closing the inlet 30 of the pump suction line 23 into the wet pump tank. Correspondingly, an outlet discharge valve 32 is provided for opening and closing the exit 33 from the wet pump tank 12 to the discharge line 24. The inlet and discharge valves are flapper valves which are pivotably secured so as to be pivotable from an open position to a closed position depending on the pressurization in the tank. In particular, the inlet valve pivots into the tank to open while the discharge valve pivots away from the tank to open. Initially, the pump system 14 is actuated so as to apply low pressure to the wet pump tank 12. At this time, as illustrated in FIG. 2, the inlet check valve 28 is opened while the outlet check valve 3 is closed. That is, the low pressure in the tank causes the inlet check valve to pivot to an opened position while causing the outlet check valve to pivot to a closed position. Accordingly, the low pressure in the tank communicates with the pump suction line 23 creating a suction so as to draw the fish from the fish inlet receptacle 18 through the pump suction line into the wet pump tank 12.

As illustrated in FIG. 2, a substantially L-shaped inlet valve hood 34 circumscribes the inlet check valve 28 in the manner shown therein with an opening 35 facing downwardly at a position below the inlet valve. When the low pressure is applied to the wet pump tank 12, the inlet valve hood 34 prevents the water being suctioned in from the fish inlet receptacle 18 from flowing proximate the inlet check valve 28. That is, as shown in FIG. 2, the inlet check valve is surrounded by an air space 29 such that when the fish are suctioned through the inlet valve, the fish drop downwardly into the tank.

This is important for the following reason. Since the water is not disposed proximate the inlet check valve 28, the inlet check valve can be closed at the appropriate time without being blocked by the fish. Thus, once a predetermined amount of fish have been suctioned from the fish receptacle 18 into the wet pump tank 12, the pump is deactivated so that fish are no longer suctioned into the tank and the inlet valve is free to close.

As illustrated in FIG. 2, the tank includes a float actuator 48 at the top portion thereof which deactivates the suction mode of the pump so as to ensure that water is not accidentally suctioned into the pump system. In particular, once the water level in the tank reaches a predetermined maximum level 46, the float actuator signals the pump system to switch from the low pressure mode to the high pressure mode. Additionally, a site glass 50 is provided to permit viewing of the interior of the tank.

FIG. 3 illustrates the tank 12 in the high pressure mode. As illustrated, under this condition the pressurization in the tank causes the check valve 28 to pivot to a closed position while causing the outlet check valve 32 to pivot outwardly to thereby open the discharge line 24. In this manner, the fish are pumped from the wet pump tank 12 through the pump discharge line and out past the separator 16 into the discharge receptacle 20. Referring again to FIG. 1, the separator 16 is designed in the conventional manner to separate the water from the fish. In particular, the fish pass through the separator while the water is drained into water return line 26 back to the fish inlet receptacle.

Figure 4:
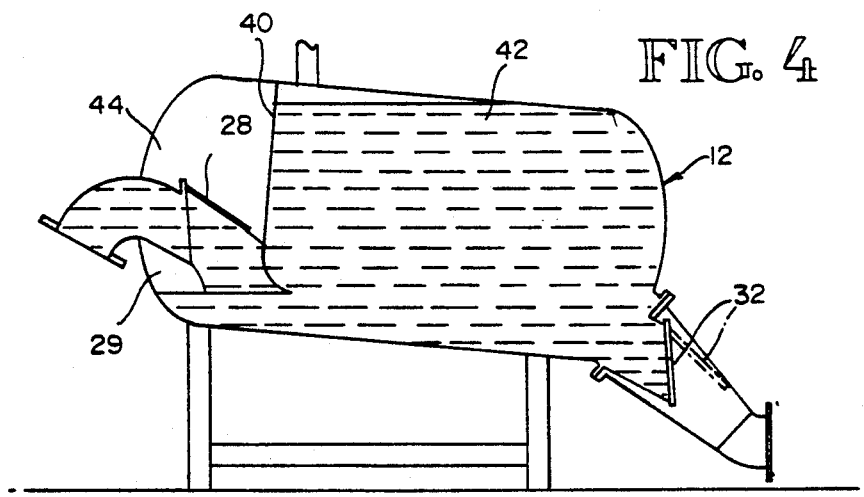
FIG. 4 is a cross-sectional view of a wet pump tank according to a second embodiment of the invention.

According to an alternate embodiment of the invention, as illustrated in FIG. 4, an inlet baffle 40 is substituted for the inlet valve hood 34. The inlet baffle is a plate which is substantially vertically disposed in the tank extending from the top portions thereof down below the inlet check valve 28. The baffle 40 is welded to the interior of the middle and top portion of the tank. As illustrated in FIG. 4, the bottom of the baffle plate is disposed below the inlet check valve 28. Thus, the inlet baffle acts to separate the tank into a main portion 42 and an inlet portion 44. In this manner, when low pressure is applied to the tank the water in the inlet portion of the tank is disposed below the inlet valve such that the inlet valve is surrounded by an air space 29. Accordingly, as described above, the fish are suctioned from the fish inlet receptacle 18 and drop from the pump suction line towards the bottom of the tank, away from the inlet valve 28. Accordingly, since there are no fish proximate the inlet valve 28, once the tank has been filled with fish and the pump deactivated, the inlet valve is able to close without interference from fish. The remaining features of the FIG. 4 embodiment are the same as the FIGS. 2 and 3 embodiment and thus are not described in further detail.

As illustrated in FIG. 2, the pump suction line 23 is introduced into the side of the wet pump tank 12 at a position approximately coinciding with the axial center line A of the tank and substantially below the maximum water line 46 of the mixture in the tank. According to the invention, it is important that the pump suction line not be introduced into the tank above the maximum water level 46 in order to ensure that the fish are not dropped a great distance into the tank which would otherwise bruise the fish. By introducing the pump suction into the side of the tank, the distance in which the fish are initially dropped into the tank is minimized.

The pumping system 14 is of a conventional design and, taken alone and apart from the side entry fish tank 12, is not considered to be inventive. As can be seen from the foregoing, by introducing the fish into the tank through the side portion thereof, the fish are not dropped a great distance into the tank as in the prior art pump described above. Thus, bruising of the fish is minimized, and yet, due to the unique hood and baffle designs, the presence of the fish in the tank do not interfere with the opening and closing of the inlet valve. Accordingly, the pump system is able to operate efficiently.

I claim:

1. A wet pump for pumping for pumping fish from a first receptacle to a second receptacle, comprising:
   a tank into which said fish are initially pumped;
   a pump suction line connected to a side of said tank and communicating said tank with said first receptacle;
   a pump discharge line for pumping said fish from said tank;
   pump means for initially creating a low pressure vacuum in said tank and for thereafter creating a high pressure in said tank;
   an inlet valve means for opening said pump suction line when said pump means creates said vacuum in said tank and for closing said pump suction line when said pump means creates said high pressure in said tank;
   a discharge valve means for closing said pump discharge line when said pump means creates said vacuum and for opening said pump discharge line when said pump means creates said high pressure; and
   hood means surrounding said inlet valve means for preventing water from flowing proximate said inlet valve means such that said fish do not interfere with the closing of said inlet valve means when said pump means is switched from the vacuum mode to the high pressure mode, wherein when said pump means creates said vacuum, said fish are suctioned through said pump suction line into said tank, and wherein when said pump means creates said high pressure, said fish are pumped from said tank through said discharge line.

2. The pump of claim 1 wherein said hood means comprises a substantially L-shaped tubular member extending into the interior of said tank and having an opening extending downwardly therein.

3. The pump of claim 2 wherein said opening is disposed below said inlet valve means.

4. The pump of claim 1 wherein said hood means comprises a baffle plate substantially vertically disposed inside said tank from one side of the tank to the other and extending from a top portion thereof to a position below said inlet valve, said baffle plate dividing said tank into a fish tank portion and an inlet portion, said inlet valve means being disposed in said inlet portion, said fish tank portion and said inlet portion communicating with each other at the bottom of said baffle plate, below said inlet valve.

5. The pump of claim 1 wherein said tank has a maximum water line representing the highest level that water in said tank will reach, and wherein said pump suction line is connected to the side of said tank at a position below said maximum water line.

6. The pump of claim 5 wherein said pump suction line is connected to the side of said tank at a position midway between the top and bottom of said tank.

7. The pump of claim 1 wherein said inlet valve means comprises a flapper valve pivotally disposed over said pump suction line such that when low pressure is applied to said tank said flapper valve pivots to an open position, and when said high pressure is applied to said tank said flapper valve pivots to a closed position.

8. The pump of claim 1 wherein said discharge valve means comprises a flapper valve pivotally disposed over said pump discharge line such that when low pressure is applied to said tank said flapper valve pivots to a closed position, and when said high pressure is applied to said tank said flapper valve pivots to an open position.

9. The pump of claim 1, further comprising means for deactivating the suction mode of said pump means once water in said tank reached a maximum water level.

10. The pump of claim further comprising a separator disposed at an outlet of said pump discharge line for separating said water from said fish.

11. The pump of claim 10, further comprising a return line communicating said separator to said first receptacle such that said water is returned to said first receptacle from said separator.

* * * * *

UNITED STATES PATENT AND TRADEMARK OFFICE
CERTIFICATE OF CORRECTION

PATENT NO. : 5,078,579
DATED : January 7, 1992
INVENTOR(S) : Robert M. Ryan

It is certified that error appears in the above-identified patent and that said Letters Patent is hereby corrected as shown below:

In column 6, claim 10, line 11, after "claim" please insert -- 1 --.

Signed and Sealed this

Twentieth Day of April, 1993

Attest:

MICHAEL K. KIRK

*Attesting Officer*    Acting Commissioner of Patents and Trademarks